(No Model.)
W. R. PATTERSON.
MEANS FOR VENTILATING TEST STATIONS OF UNDERGROUND CABLES.
No. 309,245. Patented Dec. 16, 1884.
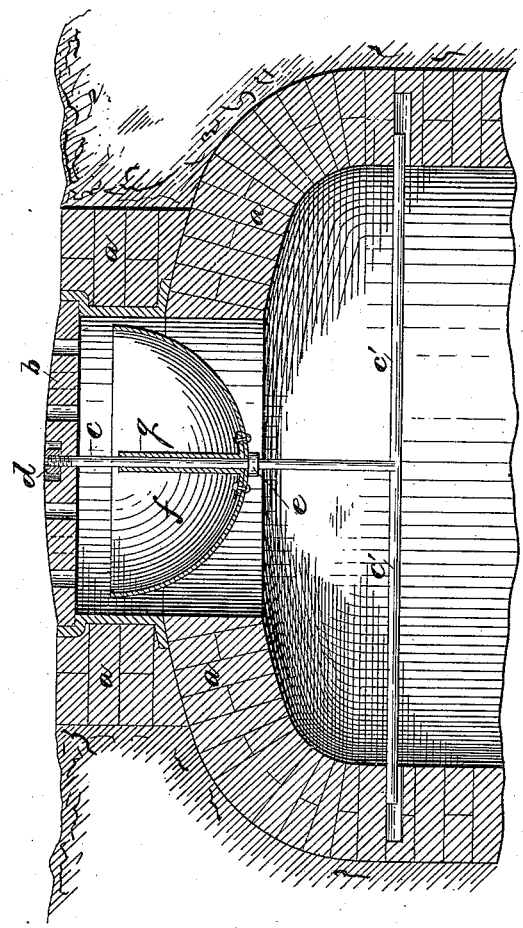
Witnesses.
Inventor.
William R. Patterson,
per George R. Barton
Attorney.

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

MEANS FOR VENTILATING TEST-STATIONS OF UNDERGROUND CABLES.

SPECIFICATION forming part of Letters Patent No. 309,245, dated December 16, 1884.

Application filed July 18, 1884. (No model.)

*To all whom it may concern:*

Be it known that I, WILLIAM R. PATTERSON, a citizen of the United States, residing at Chicago, in the county of Cook and State of Illinois, have invented a certain new and useful Improvement in Means for Ventilating Test-Stations of Underground Telegraph-Cables, (Case 34,) of which the following is a full, clear, concise, and exact description, reference being had to the accompanying drawing, forming a part of this specification.

My invention relates to the covers of the test or terminal stations of underground conduits for telegraph-cables; and its objects are to afford facilities for ventilating the conduit, and at the same time to prevent water and dirt from falling into the conduit upon the terminal or coupling of the cable.

As to the state of the art prior to my invention, reference is made to Patent No. 208,552, of October 1, 1878, and Patent No. 289,663, of December 4, 1883.

It is desirable to ventilate the conduits at the man-holes in order that the vapor may escape, which would otherwise accumulate during warm days and condense and run down on the joints of the cable. The ventilation also prevents the accumulation of illuminating and sewer gases, which are dangerous to those making repairs.

My invention is illustrated in the accompanying drawing, in which $a$ is the brickwork of the upper part of the man-hole of the test-station. The cover $b$, which is provided with openings for ventilation, is placed over the man-hole, as shown. The rod $c$ extends upward from the cross-piece $c'$ through the center of the cover. The cross-piece rests in the niches in the sides of the wall of the man-hole, as shown. This rod $c$ might conveniently be fastened to a hook at the bottom of the conduit, instead of being fastened to the cross-piece $c'$. The cover is held down by the nut $d$, which is screwed upon the upper end of the rod. The stop $e$ is provided upon the rod, and the receptacle or basin $f$, preferably of galvanized iron, rests upon this stop. The rod $c$ passes through the sleeve $g$, which is secured to the center of the basin $f$. This receptacle should be water-tight, and so large as to come under all the holes in the cover, thus catching any water or dirt that may fall through, and thereby protecting the cable placed in the conduit below from injury. Ordinarily all rain which falls through the openings in the cover will be evaporated and escape above through the openings in the cover.

It is evident that the basin might be supported by the cross-piece $c'$, in which case the stop $e$ would be dispensed with.

When it is desired to descend into the man-hole, the nut $d$ is removed and the cover $b$ is taken off. The basin $f$ may then be taken off the rod. The T-shaped piece formed by the rod $c$ and the cross-piece $c'$ is then removed, the niches in the wall being of such depth as will permit this to be done. The man-hole being thus opened, any work required may be done in the conduit below.

I claim—

1. The combination, with the cover provided with vents or openings, of the basin placed below and supported by the rod which extends through the sleeve in the center of the basin, and is secured to the cover, substantially as and for the purpose specified.

2. The combination, with the cover, of a basin provided with a central sleeve placed below and supported by the T-piece, substantially as and for the purpose specified.

3. The combination, with the cover $a$, placed over the man-hole and provided with vent-holes, of a basin, $f$, provided with the central sleeve, $g$, and the T-piece secured to the cover above and resting in the niches in the wall of the man-hole below, substantially as and for the purpose specified.

4. The combination, with the basin $f$, provided with the sleeve $g$, of the rod fastened below the basin and passing through said sleeve and secured to the perforated cover above, substantially as and for the purpose specified.

In witness whereof I hereunto subscribe my name this 15th day of July, A. D. 1884.

WILLIAM R. PATTERSON.

Witnesses:
GEORGE P. BARTON,
HENRY FRANKFURTER.